(12) United States Patent
Jenkins

(10) Patent No.: US 8,747,033 B2
(45) Date of Patent: Jun. 10, 2014

(54) THROUGH TOOL COOLANT ADAPTER FOR DRILLING MOTOR

(75) Inventor: William L. Jenkins, Burleson, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1093 days.

(21) Appl. No.: 12/552,982

(22) Filed: Sep. 2, 2009

(65) Prior Publication Data
US 2011/0052338 A1 Mar. 3, 2011

(51) Int. Cl.
*B23Q 11/10* (2006.01)

(52) U.S. Cl.
USPC .................................. 408/56; 408/57; 279/20

(58) Field of Classification Search
USPC .................................. 408/56, 57, 59; 279/20
IPC ......................................................... B23B 51/06
See application file for complete search history.

(56) References Cited

U.S. PATENT DOCUMENTS

| | | | | |
|---|---|---|---|---|
| 2,933,321 A | * | 4/1960 | Cascone | 279/20 |
| 3,024,030 A | * | 3/1962 | Koch | 279/20 |
| 3,620,636 A | * | 11/1971 | Godard | 408/141 |
| 3,773,117 A | * | 11/1973 | Dussel | 173/4 |
| 4,557,643 A | * | 12/1985 | Cioci | 409/136 |
| 4,643,621 A | * | 2/1987 | Fuller et al. | 408/57 |
| 4,693,646 A | | 9/1987 | Andrews | |
| 4,743,145 A | * | 5/1988 | Hendricks et al. | 408/59 |
| 4,890,963 A | | 1/1990 | Keritsis | |
| 4,957,398 A | | 9/1990 | Schneider | |
| 5,419,661 A | | 5/1995 | Meachum | |
| 5,439,333 A | | 8/1995 | Kubo | |
| 5,601,386 A | * | 2/1997 | Wells | 408/59 |
| 5,613,612 A | | 3/1997 | Levan | |
| 5,674,031 A | | 10/1997 | Bilz | |
| 5,947,657 A | * | 9/1999 | Lipohar et al. | 408/97 |
| 6,050,756 A | | 4/2000 | Buchholz | |
| 6,575,673 B2 | | 6/2003 | Born | |
| 6,644,900 B1 | | 11/2003 | Sugata | |
| 6,702,199 B1 | | 3/2004 | Sugata | |
| 6,729,627 B2 | | 5/2004 | Komine | |

(Continued)

FOREIGN PATENT DOCUMENTS

| | | | | |
|---|---|---|---|---|
| DE | 3222037 A1 | * | 4/1984 | B23Q 11/10 |
| DE | 29813998 | | 10/1998 | |

(Continued)

OTHER PUBLICATIONS

European Search Report for 1017498.-2302, dated Jan. 3, 2011, 6 pages.

(Continued)

*Primary Examiner* — Daniel Howell
*Assistant Examiner* — Michael Vitale
(74) *Attorney, Agent, or Firm* — Bracewell & Giuliani LLP

(57) ABSTRACT

A collet chuck for use in boring through a workpiece that provides a cooling and cleaning fluid to the element that is machining the workpiece. One end of the collet chuck is coupled to the drive end of a motor and its other end retains the machining element. The motor provides a rotational force to the collet chuck and machining element used in machining the workpiece. The machining element, which can be a drill bit or reamer, includes an axial passage that communicates with an annulus in the chuck. The cooling/cleaning fluid flows into the annulus through a rotary seal that circumscribes the collet chuck.

18 Claims, 3 Drawing Sheets

(56) References Cited

U.S. PATENT DOCUMENTS

| | | |
|---|---|---|
| 6,746,023 B2 | 6/2004 | Komine |
| 7,134,812 B2 | 11/2006 | Beckington |
| 7,137,185 B2 | 11/2006 | Voss |
| 7,147,410 B2 | 12/2006 | Jansen |
| 7,192,228 B2 | 3/2007 | Haenle |
| 7,303,363 B2 | 12/2007 | Krause |
| 7,306,238 B2 | 12/2007 | Oshnock |
| 7,500,811 B2 | 3/2009 | Pfob |
| 7,563,062 B1 | 7/2009 | Chen |
| 2007/0177953 A1 | 8/2007 | Matsumura et al. |
| 2008/0072704 A1* | 3/2008 | Clark et al. ............ 74/608 |

FOREIGN PATENT DOCUMENTS

| | | | |
|---|---|---|---|
| DE | 10205234 | 8/2007 | |
| GB | 2017543 | 10/1979 | |
| JP | 07164277 A | * 6/1995 | ............ B23Q 11/10 |

OTHER PUBLICATIONS

Communication Pursuant to Article 94(3) EPC for 10 174 980.2, European Patent Office, Sep. 26, 2011, 5 pages.

* cited by examiner

THROUGH TOOL COOLANT ADAPTER FOR DRILLING MOTOR

BACKGROUND

1. Field of Invention

The present disclosure relates generally to a system and method of delivering fluid through a machining element. More specifically, the present disclosure is directed to a tool adapted to receive a flow of cooling fluid into a machining element holder, that then flows through the machining element.

2. Description of Prior Art

Machining elements, such as drill bits, reamers, grinders, saws and like, that are used for machining through a workpiece typically remove particles of the material making up the workpiece. The removed particles can sometimes become wedged between the machining element and the portion of the workpiece being machined. This hinders machining efficiency since the particles may be machined a second time and also through possible additional heating of the machining element.

Machined particles can also become problematic when layers of different material make up the workpiece to be machined. As shown in FIG. 1, a known example of machining is shown in a side partially sectional view. A drill bit 8 is illustrated forming a bore 10 through a laminated stack 12 of material layers 14, 16, 18, 20. Particles 22 formed during the machining step are illustrated exiting the bore 10 on top of the stack 12. After being removed from one of the layers 14, 16, 18, 20, the particles 22 can be pushed upward in the space between the drill 8 and bore 10, or within grooves 24 provided in the drill 8 surface. However, when machining two or more layers of material, particles 22 removed from the bore 10 may erode material of another layer and enlarge that layer's bore diameter. The increase in bore size from particle erosion may exceed specified tolerance. Erosion can be especially pronounced when the layers 14, 16, 18, 20 are formed from different materials having different material properties, such as hardness, ductility, yield strength and the like. For example, if the material of layer 18 is harder than one or both of layers 14, 16, particles 22 machined from layer 18 can enlarge the bore 10 through layers 14, 16 through erosion when exiting the bore 10.

SUMMARY OF INVENTION

Disclosed herein is a tool for cooling a machining element during use and optionally, for removal of chips produced during machining. In one example the tool is for machining a workpiece and includes an annular seal assembly, a collet chuck inserted through the annular seal assembly and rotatable with respect to the seal assembly, an annulus in the collet chuck, a machining element affixed on an end of the collet chuck, a passage formed through the machining element, so that the end of the machining element opposite the collet chuck is in fluid communication with the annulus, a drive source coupled to an end of the collect chuck opposite the machining element, a housing circumscribing the seal assembly and a portion of the rotating drive source, and a fluid flow line extending through an opening in the housing and having an end at the seal assembly and in fluid communication with the annulus, so that fluid flowing through the fluid flow line into the annulus is flowable through the passage in the machining element.

Also disclosed is a system for machining workpieces that includes a drive source having a hand grip, a selectively rotatable and extendable drive shaft, and a housing circumscribing the drive shaft. Further included with the system is a collet chuck having an end coupled with the drive shaft, a machining element coupled in an end of the collet chuck opposite the drive shaft, a cutting surface on the machining element, a cavity in the collet chuck in fluid communication with a fluid flow, and a passage formed within the machining element having an end in fluid communication with the cavity and an end adjacent the cutting surface, so that fluid flow provided to the cavity flows through the passage and adjacent the cutting surface.

Another embodiment disclosed herein is a drill with a cooling system that includes a handheld drill motor, a drive shaft selectively rotatable and selectively extendable from the drill motor, a bit holder having an end affixed to the drive shaft, a sealed cavity in the bit holder, a rotary seal circumscribing the bit holder having an outer diameter about twice the diameter of the bit holder, a supply of cooling fluid in fluid communication with the cavity, and a drill bit attached to the end of the bit holder opposite the drive shaft.

BRIEF DESCRIPTION OF DRAWINGS

Some of the features and benefits of the present invention having been stated, others will become apparent as the description proceeds when taken in conjunction with the accompanying drawings, in which.

Figure 1:
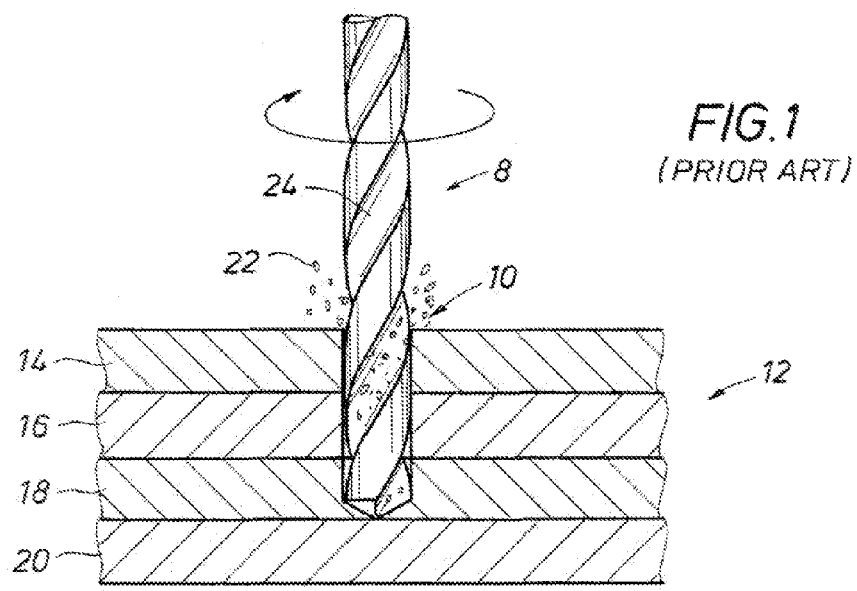
FIG. 1 shows in a side partially sectional view a prior art example of drilling through a laminated stack of layers.

It will be understood the improvement described herein is not limited to the embodiments provided. On the contrary, the present disclosure is intended to cover all alternatives, modifications, and equivalents, as may be included within the spirit and scope of the improvement as defined by the appended claims.

DETAILED DESCRIPTION OF INVENTION

The improvement(s) of the present disclosure will now be described more fully hereinafter with reference to the accompanying drawings in which disclosed embodiments are shown. The disclosed improvement(s) may, however, be embodied in many different forms and should not be construed as limited to the illustrated embodiments set forth herein; rather, these embodiments are provided so that this disclosure will be through and complete, and will fully convey the scope of the disclosure to those skilled in the art. Like numbers refer to like elements throughout.

It is to be understood that the improvement(s) described herein is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, applicants' improvement(s) is therefore to be limited only by the scope of the appended claims.

Figure 2:
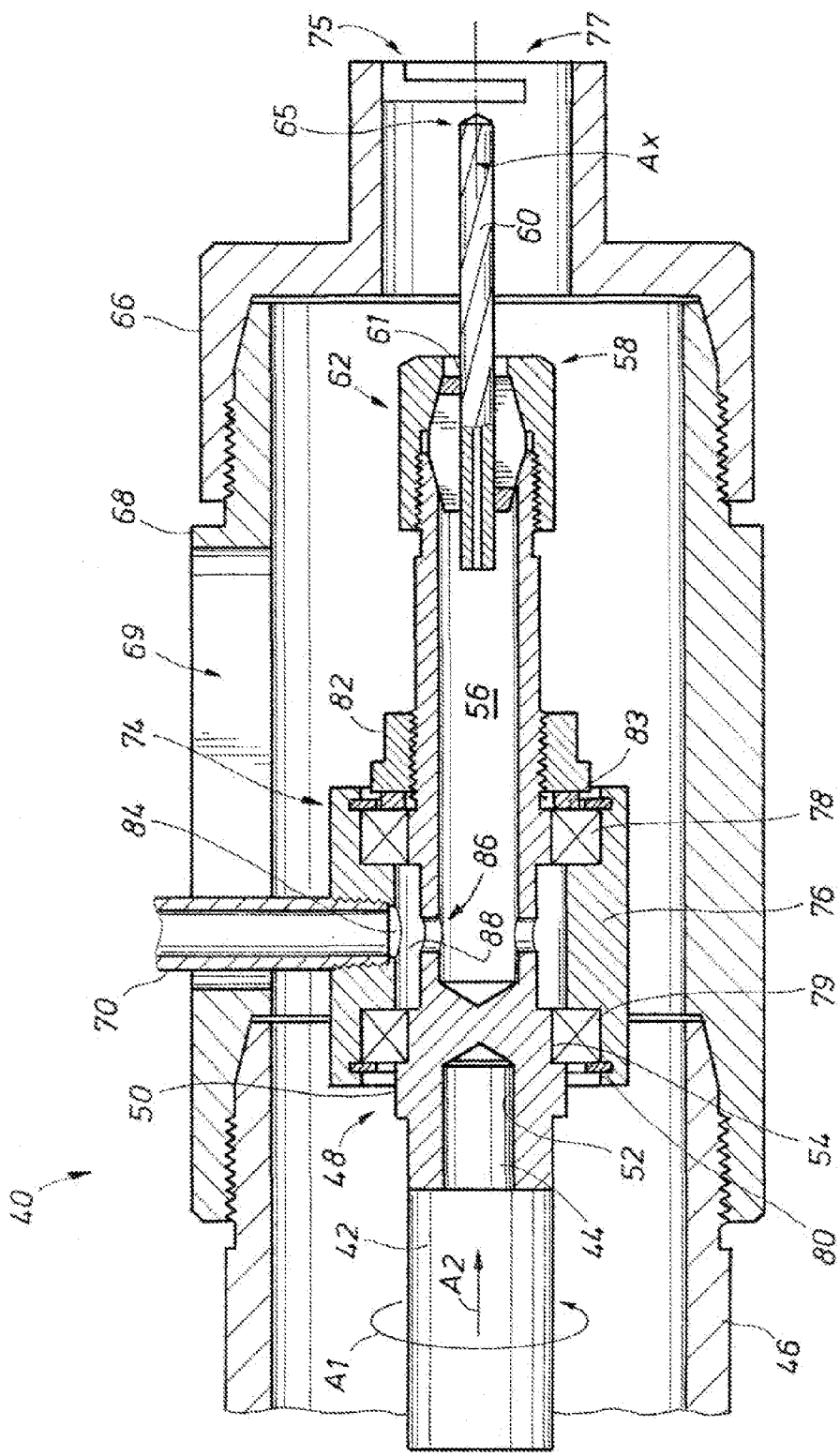
FIG. 2 illustrates a side partial sectional view of an example of a tool with an adapter for delivering a fluid flow through a machining element.

FIG. 2 provides in a side partial sectional view, and example of a tool assembly 40 for machining a workpiece that includes a system for delivering a cooling fluid through a machining element. In the example of FIG. 2, the tool assembly includes a drive source 42 schematically illustrated as selectively providing a rotating force onto the machining element. In this example the rotating force is represented by the arrow $A_1$. Drive source 42 may also selectively provide an axial force, which is represented by arrow $A_2$. Extending from an end of the rotating source 42 is a spindle 44 for transferring the rotating and/or axial force to other components within the tool assembly 40. A housing 46 is shown circumscribing the drive source 42 and extending up at least with the terminal end of the spindle 44.

Coupled on the spindle 44 is a collet chuck 48 shown having an elongated body 50. A receptacle 52 is formed to receive the spindle 44 therein. The receptacle 52 is provided on the end of the body 50 adjacent the drive source 42. The coupling between the spindle 44 and the receptacle 52 may include threads, splines, pins, or any other known way of fastening mechanical members. The receptacle 52 terminates at a bulkhead 54, which defines a substantially solid portion of the body 50. A cavity 56 is within the body 50 on the side of the bulkhead 54 opposite the receptacle 52. Cavity 56 has an elongate side oriented along the direction of the tool axis $A_x$. The cavity 56 as shown in FIG. 2 extends from the bulkhead 54 through the remaining length of the body 50 to define an open end 58 on the side of the body 50 opposite the receptacle 52.

A machining element 60, such as a drill bit, is shown attached to the body 50 and aligned substantially parallel with the axis $A_x$. A collet nut 62 is affixed on the open end 58 having an aperture 61 through its mid-section in which a shank of the machining element 60 is retained and affixed to the collet chuck 48. The machining element 60 as shown in FIG. 2 can be any type of device for boring through or machining a workpiece. Examples include a drill bit, a reamer, a grinder, and the like. In one embodiment the machining element 60 is a drill bit with ridges or flutes along its outer surface. A passage 64 is illustrated formed axially through the machining element 60 that provides fluid communication between the cavity 56 and the cutting surface 65 of the machining element 60.

An optional connector 68 is shown attached on the terminal end of the drive source housing 46. In another embodiment, the drive source housing 46 may encompass the collet chuck 48 in place of the connector 68. The connector 68 circumscribes a portion of the collet chuck 48 and shown as a generally annular member. Alternatively, the connector 68 may not fully circumscribe the collet chuck 48, but instead may be one or more elongated elements extending from the drive source housing 46 along the tool axis $A_x$. In the embodiment shown, an elongated slot 69 is provided through a wall of the connector 68; with the slot's 69 elongate length substantially aligned with the tool axis $A_x$. A fluid flow line 70 is shown in sectional view extending through the slot 69 and into fluid communication with the cavity 56.

Circumscribing the collet chuck 48 is a rotary seal assembly 74 that facilitates coupling between the flow line 70 and cavity 56. As shown, the seal assembly 74 includes a sleeve-like annular body and is positioned adjacent the bulkhead 54. The bulkhead 54 outer diameter is greater than the collet chuck 48 diameter over which the sleeve body 76 is disposed, thereby providing a shoulder against which the sleeve 76 is set. Bearings 78, which may optionally be sealed ball, roller, or needle bearings, are provided between the sleeve 76 and collet chuck 48. Thus, the sleeve 76 may remain substantially stationary as the collet chuck 48 rotates. The sealed bearings 78 also form a pressure barrier between the collect chuck 48 and sleeve body 76. Grooves 79 are shown provided in the sleeve 76 inner surface and configured to receive the bearings 78 therein. Snap rings 80 are set into recesses in the sleeve 76 inner surface and retain the bearings 78 within the grooves 79. The seal assembly 74 is kept in place by an annular retention nut 82 shown coaxially circumscribing the collet chuck body 50 on a side of the seal assembly 74 opposite the bulkhead 54. The retention nut 82 is attached to the collet chuck body 50, such as by corresponding threads. An inner radial portion of the retention nut 82 applies an axial force against the bearings' 78 race adjacent the chuck 48 body, but is out of contact with the bearings' 78 race adjacent the sleeve body 76. Thus the bearings' 78 race adjacent the collet chuck 48 rotates along with collet chuck 48 rotation. Whereas the bearings' 78 race adjacent the sleeve 76, can remain stationary. An optional washer 83 may be provided between the retention nut 82 and the bearings' 78 race adjacent the collet chuck 48 for transferring the axial force between the nut 82 and bearings 78.

Radially formed through the non-rotating sleeve body 76 is a port 84 on which the flow line 70 is attached. A gallery annulus 88 is shown circumscribing the rotatable collet chuck body 50 beneath the seal assembly 74. Therefore the port 84 registers with the annulus 88 during full rotation of the collet chuck 48. One or more openings 86 are formed through the collet chuck body 50 between the annulus 88 and cavity 56. The opening(s) 86 provide fluid communication between the annulus 88 and the cavity 56 so that fluid flowing through the flow line 70 and port 84 can freely flow into the cavity 56. Accordingly, introducing fluid into the cavity 56 causes fluid to flow through the passage 64 and exit the machining element 60 proximate the cutting surface 65. The fluid removes thermal energy within the machining element 60 due to machining or other sources. Moreover, after the fluid flow exits the passage 64, it becomes a cleaning source by sweeping away machined particles in its flow stream and moves them away from the cutting surface. This eliminates the low efficiency of machining the same piece of material twice and can also significantly reduce the chances of a harder particle eroding a softer material.

An optional nosepiece 66 is shown included with the tool assembly 40 of FIG. 2. As shown, the nosepiece 66 is an outer housing circumscribing a portion of the collet chuck 48 and machining element 60. Embodiments include a housing 46 that extends along the length of the collet chuck and past the machining element 60. Although shown as having a reduced diameter that transitions along the length of the machining element 60, the nosepiece 66 can have a consistent diameter or contoured at a slope or angle. In the configuration shown in FIG. 2, the tool assembly 40 is an retracted mode; forward movement of the machining element 60 can initiate machining a workpiece. Thus, in embodiments wherein the drive source 42 provide an axial force as represented by arrow $A_2$, the collet chuck 48 is moved along the assembly 40 axis so that the machining element 60 is pushed past the edge of the nosepiece 66 and through its corresponding opening 77 to contact and machine a workpiece. The elongated slot 69 provides a length of lateral travel for the flow line 70 so it can move unimpeded by the connector 68. An optional coupling 75 is shown adjacent the opening 77. In the embodiment of FIG. 2, the coupling 75 is a bayonet or J-type slot (not shown) in which a corresponding coupling provided on the workpiece is received. After receiving the insertable portion of the workpiece coupling in the slot of the coupling 75, the nosepiece 66 can be rotated to align that portion in the coupling 75 slot bottom. In one example of use, the drive source 42 is a movable and/or hand held device that can be remotely applied to various machining operations.

Figure 3B:
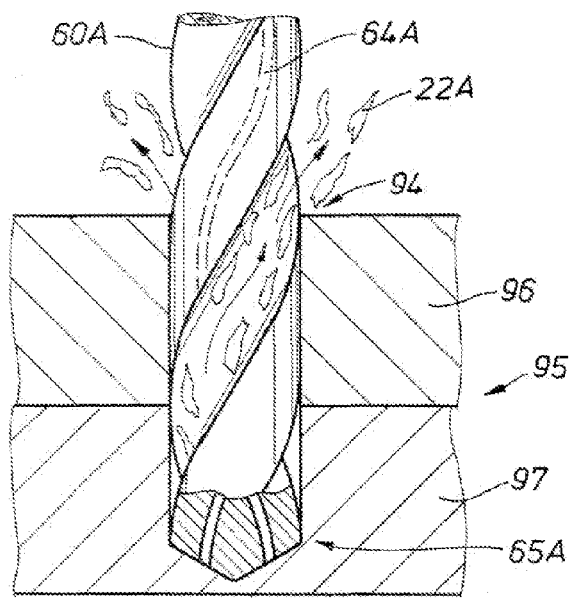
FIG. 3B depicts in side partial sectional view an example of a machining element machining a workpiece.
Figure 3A:
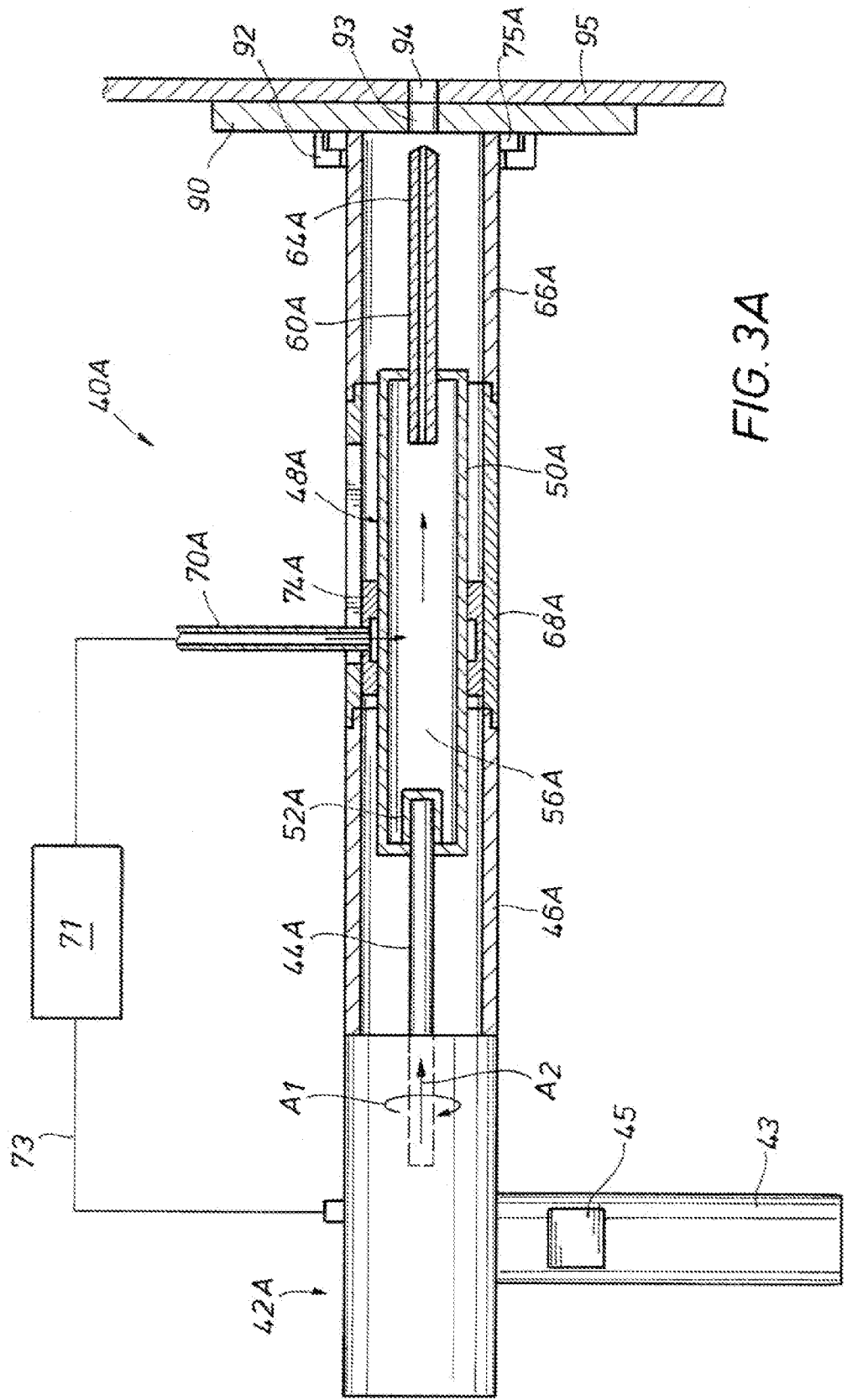
FIG. 3A schematically illustrates a side partially sectional view of a tool coupled with a machining element holder having a machining element.

Referring now to FIG. 3A, a side schematical view of an alternative tool assembly 40A is provided in a partial sectional view. In this embodiment, the drive source 42A is a hand held drill-type motor that includes a handle 43 for gripping by its user. Schematically represented on the handle 43 is a control module 45 by which operation of the drive source 42 may be facilitated. This control module 45 can include on/off switches as well as directional controls for rotating the spindle 44A as represented by arrow $A_1$ or reciprocating the spindle 44A as represented by arrow $A_2$; The power, force, and/or speed of the spindle 44A can optionally be set using the control module 45. Examples of drive sources may be found in Born, U.S. Pat. No. 6,575,673 and Krause et al, U.S. Pat. No. 7,303,363, assigned to assignee of the present application, the entire contents of which are referenced for incorporation herein in their entireties.

As noted above, the spindle 44A is coupled with the collet chuck 48 via a receptacle 52A and the chuck body 50A. Therefore, rotational and/or axial movement of the spindle 44A is imparted to the collet chuck 48A and on to the machining element 60A. A fluid supply 71 is provided in the embodiment of FIG. 3A and is schematically illustrated attached to the fluid supply line 70A. As noted by the arrows in the cavity. 56A, fluid flow supplied by the fluid supply is forced through the fluid supply line 70A and into the cavity 56A, where it can then flow through the passage 64A and the machining element 60A. As described above, the rotary seal 74A enables a side injection of the cooling and cleaning fluid into the collet chuck 48A, even as the collet chuck is rotating and/or axially moving within the housings 46A, 68A, 66A. In the embodiment of FIG. 3A, the drive source 42A may be operable by a pressurized fluid, such as a pneumatic source. Thus in an optional embodiment, a pneumatic supply line 73 is shown connecting the drive source 42A with the fluid supply 71. Therefore the fluid supply 71 in this alternative embodiment can operate the drive source 42A and also provide a cooling and cleaning fluid flow for a machining operation of the tool assembly 40A. The fluid delivered to the chuck 48 can include liquids, gas, such as air, nitrogen, two-phase fluids, and combinations thereof. In one example, the fluid is a water based fluid containing a rust inhibitor, that can be synthetic or oil based. Fluids for cooling, lubricating, or both can be included.

As shown, the nosepiece 66A is coupled with a template-like drill plate 90 on which a coupling 92 is provided that is configured to mate with a coupling 75A provided on the nosepiece 66A. The drill plate 90 is attached to a workpiece 95 that is to be machined using the tool assembly 40A. Therefore the coupling 92 is strategically placed so that by extending the machining element 60A as aligned per the respective couplings 75A, 92, a corresponding drill hole 94 can be formed through the workpiece 95. An optional pilot hole 93 is provided in the drill plate 90 through which the machining element 64A can pass.

A detailed example of a drill hole 94 being formed in the workpiece 95 is shown in a side partially sectional view in FIG. 3B. As shown, the machine element 60A, shown as a drill bit or auger, has penetrated the surface of the workpiece 95 and extended into layers 96, 97 making up a portion of the workpiece 95. Particles 22A are formed as the machining element 60A removes portions of material from the layers 96, 97 of the workpiece 95. However, rather than residing along the cutting surface 65A at the bottom of the drill hole 94, the particles 22A are removed from the drill hole 94 by the fluid flow exiting the passage 64A. Therefore, in situations where layer 96 is made of a material softer than the material of layer 97, the particle 22A from machining layer 97 will not erode or portions of layer 96 thereby increasing the drill hole 94 diameter within layer 96.

Figure 4:
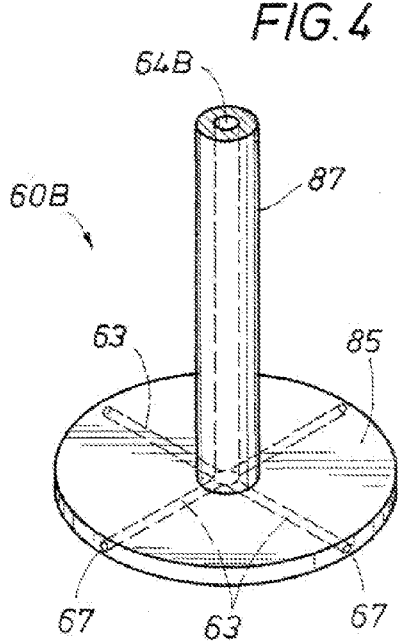
FIG. 4 depicts in perspective view an example of a machining element.

An alternative machining element 60B is illustrated in perspective view in FIG. 4. In this example, the machining element 60B resembles a circular saw having a saw blade 85 transversely mounted on a shaft 87. A passage 64B is formed through the shaft 87 that then registers with passages 63 (shown in dashed outline) formed within the blade 85. Exit ports 67 are provided along the blade 85 have a periphery to allow an exit port for any fluid inserted or injected within the passage 64B.

The present system and method described herein, therefore, is well adapted to carry out the objects and attain the ends and advantages mentioned, as well as others inherent therein. While a presently preferred embodiment has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A tool for machining a workpiece comprising:
a housing having an open distal end;
a drive source in the housing and having a spindle coaxial with the housing;
a chuck body mounted on an end of the spindle for rotation therewith;
an axial cavity in the chuck body that intersects a radial opening in the chuck body;
a non rotating sleeve circumscribing a portion of the chuck body and having a mid portion with an inner diameter greater than an outer diameter of the chuck body, defining an annular gallery recess between the sleeve and the chuck body that is in fluid communication with the radial opening in the chuck body;
proximal and distal bearings between the outer diameter of the chuck and the annular sleeve at proximal and distal edges of the gallery recess;
the chuck body having a distal portion extending past the sleeve toward the distal end of the housing, the distal portion of the chuck body having a set of external threads;
a retainer nut in engagement with the external threads and cooperatively bearing against the distal bearing to retain the sleeve on the chuck body;
a machining element affixed on a distal end of the chuck body distal from the retainer nut for protrusion through the distal end of the housing;
a passage formed through the machining element, so that an end of the machining element opposite the chuck body is in fluid communication with the cavity;
a fluid flow line extending through an opening in the housing and a port formed radially through the sleeve and having an end in fluid communication with the cavity through the gallery recess and the radial opening, so that fluid flowing through the fluid flow line into the cavity is flowable through the passage in the machining element; wherein:
the machining element has a proximal end located in the cavity; and the cavity has an inner diameter that is greater than the proximal end of the machining element from the radial opening to the distal end of the chuck body.

2. The tool of claim 1, further comprising an annular nosepiece coaxially mounted on the distal end of the the housing and that is selectively removable from the housing.

3. The tool of claim 1, further comprising:
a non rotating washer sandwiched between the distal bearing and the retainer nut, the retainer nut bearing against the washer.

4. The tool of claim 1, further comprising:
an annular external and distal facing shoulder on the chuck body that is in engagement with a proximal side of the proximal bearing; and
wherein a proximally directed force exerted by the retainer nut passes through the proximal bearing, the sleeve, and the distal bearing to the shoulder.

5. The tool of claim 1, further comprising a tool coupling on the distal end of the housing that is selectively engagable with an anchoring coupling.

6. The tool of claim 1, further comprising:
an annular proximally facing recess in the sleeve, the proximal bearing being located in the proximally facing recess;
a proximal bearing retainer ring in engagement with the sleeve at a proximal end of the proximally facing recess that retains the proximal bearing;
an annular distally facing recess in the sleeve, the distal bearing being located in the distally facing recess; and
a distal bearing retainer ring in engagement with the sleeve at a distal end of the distally facing recess that retains the distal bearing.

7. The tool of claim 1, further comprising a collet at the distal end of the chuck body that grips the machining element.

8. The tool of claim 1, wherein:
the drive source selectively exerts an axial pushing force onto the chuck body that is transferable to the machining element;
the opening in the housing is an axially elongated slot; and
the axial force causes the sleeve to move in a distal direction relative to the housing.

9. A system for machining workpieces comprising:
a drive source comprising:
a hand grip;
a selectively rotatable drive shaft that is axially extendable along a drive shaft axis; and
a housing circumscribing the drive shaft;
a collet chuck having proximal end coupled with the drive shaft, so that when the drive shaft rotates the collet chuck rotates and when the drive shaft axially extends the collet chuck axially extends;
a machining element having a shaft coupled in a distal end of the collet chuck opposite the drive shaft;
a cutting surface on the machining element;
a cavity in the collet chuck;
an annular sleeve circumscribing a portion of the collet chuck having a radial opening that receives a fluid flow line and that is in fluid communication with the cavity in the collet chuck;
proximal and distal bearings coaxially disposed between the sleeve and the collet chuck, so that when the collet chuck is rotated, the sleeve remains stationary with respect to the housing;
external threads on the collet chuck on a distal side of the distal bearing;
a retainer nut having internal threads that engage the external threads, the retainer nut having a proximal side in cooperative engagement with the distal bearing and exerting a proximally directed force along a load path through distal bearing, the sleeve and the proximal bearing to retain the sleeve on the collet chuck;
a passage formed within the machining element having a proximal end in fluid communication with the cavity and a distal end adjacent the cutting surface, so that fluid flow provided to the cavity flows through the passage and adjacent the cutting surface; and
a pneumatic supply that provides the fluid flow to the cavity and also provides a fluid flow to the drive source, so that the drive source is pneumatically powered.

10. The system of claim 9, further comprising:
a non rotating washer sandwiched between the retainer nut and the distal bearing.

11. The system of claim 10, further comprising:
a distal bearing retaining ring secured between a distal side of the distal bearing and the sleeve to retain the distal bearing; and wherein
the distal bearing retaining ring encircles the washer.

12. The system of claim 9, further comprising: an annular external and distal facing shoulder on the collet chuck that is in engagement with a proximal side of the proximal bearing; and
wherein load path passes to the shoulder.

13. The system of claim 9, wherein:
the shaft of the machining element has a proximal end located in the cavity; and
the portion of the cavity within the sleeve has an inner diameter that is greater than a diameter of the shaft of the machining element.

14. The system of claim 9, wherein the external threads are proximal from a proximal end of the shaft of the machining element.

15. The system of claim 9, wherein:
the proximal bearing is located in a counterbore of the sleeve extending to a proximal side of the sleeve; and
the distal bearing is located in a counterbore of the sleeve extending to a distal side of the sleeve.

16. A drill having a cooling system comprising:
a handheld drill motor;
a drive shaft selectively rotatable and selectively extendable from the drill motor along an axis of the drive shaft;
a chuck body coupled to the drive shaft for rotation therewith, the chuck body having an external forward facing shoulder and an external threads forward of the shoulder;
a bit holder on a a forward end of the chuck body forward of the external threads;
a cavity in the chuck body, the cavity having an open end at the bit holder;
a sleeve circumscribing the chuck body having an inner diameter greater than an outer diameter of the bit holder, so that when the chuck body rotates the sleeve is non-rotating and when the chuck body axially moves, the sleeve axially moves with the bit holder;
a flow port formed laterally through the sleeve and chuck body, and a cooling fluid line having an end connected to the flow port to supply a cooling fluid to the cavity;
an outer housing circumscribing the drive shaft and the chuck body and an elongated slot in the outer housing through which the cooling fluid line extends;
a rearward bearing between the sleeve in abutment with the forward facing shoulder on the chuck body;
a forward bearing between the sleeve and the chuck body rearward from the external threads;

a retainer nut in engagement with the external threads that exerts an rearward force on the forward bearing, which passes through the sleeve and the rearward bearing to the forward facing shoulder;

a drill bit attached to the bit holder; and a passage through the drill bit that is in fluid communication with the cooling fluid flowing into the cavity.

17. The drill of claim 16, wherein the cooling fluid line moves in unison with the sleeve and relative to the housing as the sleeve moves axially.

18. The drill of claim 16, further comprising a gallery annulus on the chuck body that registers with the port in the sleeve.

* * * * *